March 2, 1965  R. L. LEDFORD ETAL  3,172,092
VARIABLE RELUCTANCE ANGLE TRANSDUCER
Filed July 26, 1960  2 Sheets-Sheet 1
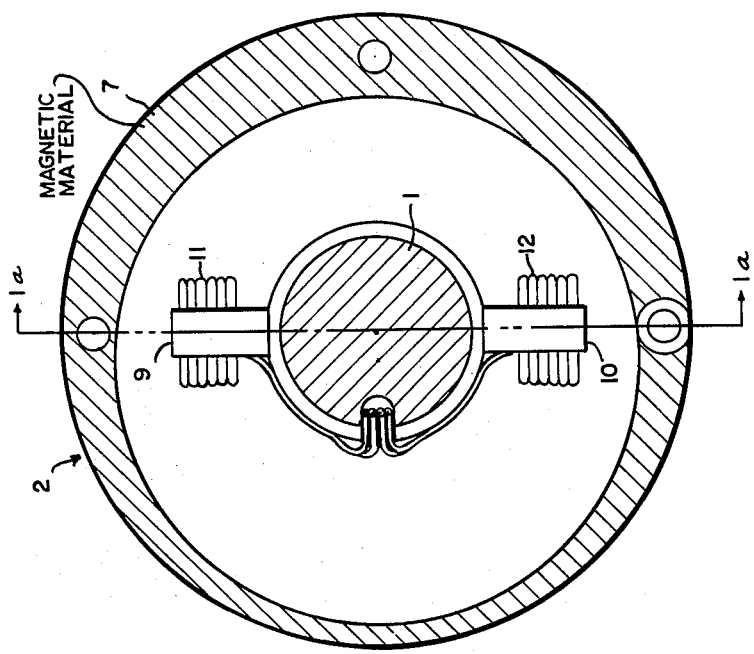
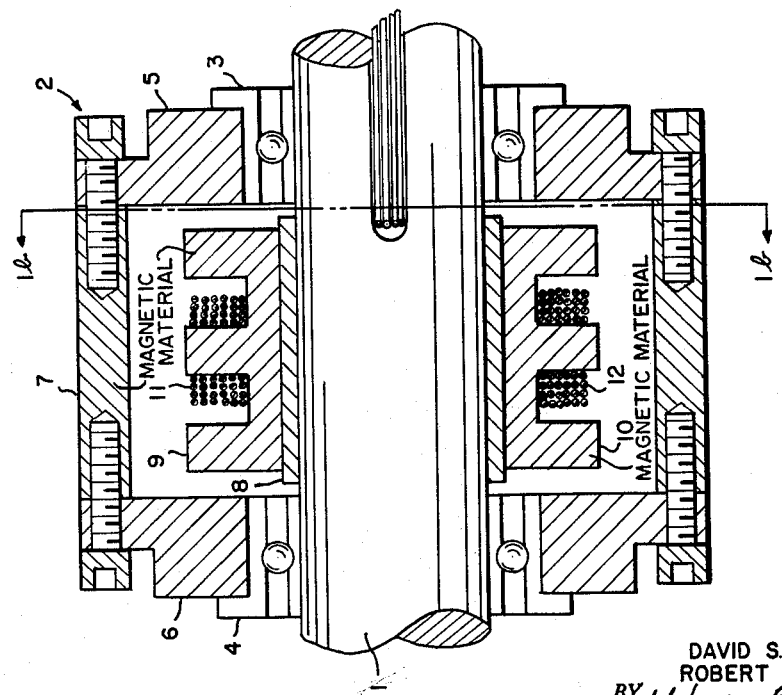
INVENTORS.
DAVID S. BYNUM
ROBERT L. LEDFORD
BY
ATTORNEY
AGENT March 2, 1965   R. L. LEDFORD ETAL   3,172,092
VARIABLE RELUCTANCE ANGLE TRANSDUCER
Filed July 26, 1960   2 Sheets-Sheet 2
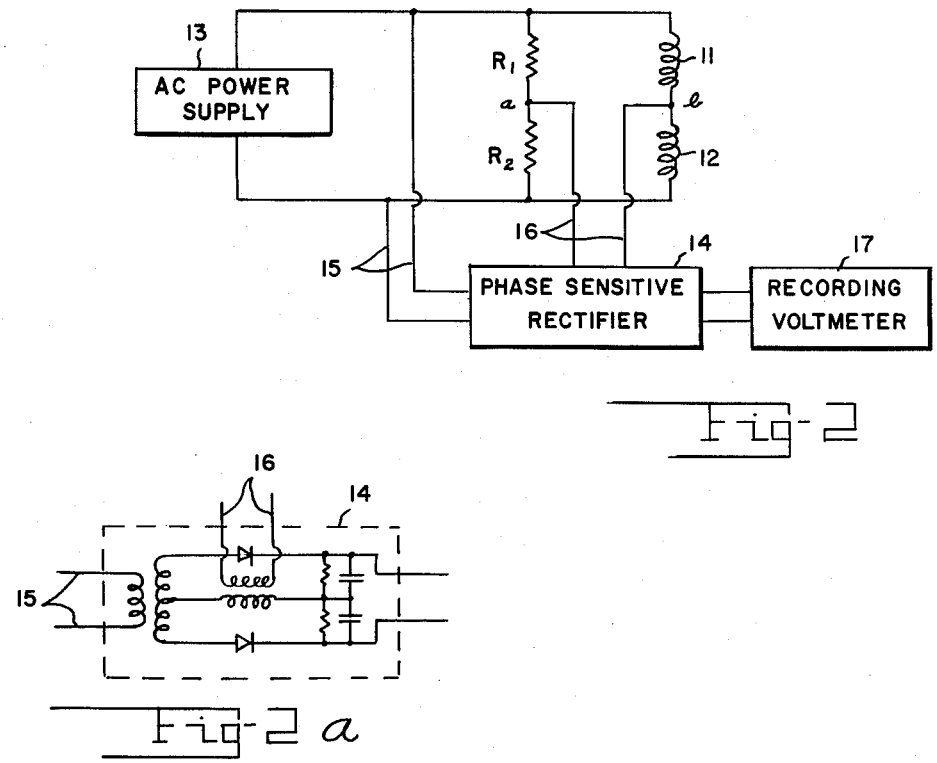
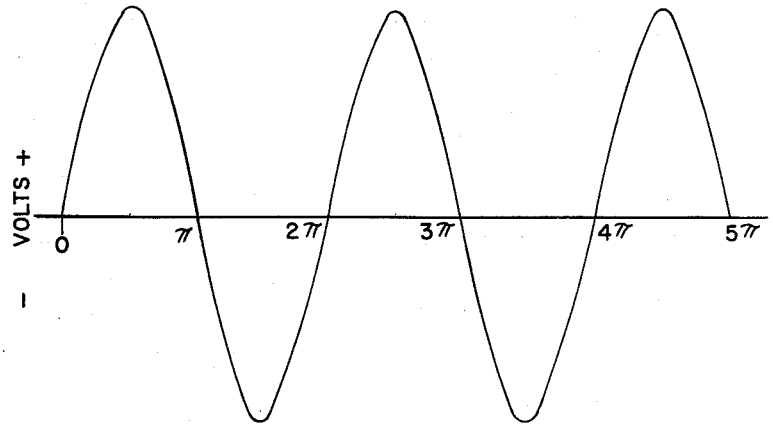
INVENTORS.
DAVID S. BYNUM
ROBERT L. LEDFORD
BY
ATTORNEY
AGENT

United States Patent Office 3,172,092
Patented Mar. 2, 1965

3,172,092
VARIABLE RELUCTANCE ANGLE TRANSDUCER
Robert L. Ledford and David S. Bynum, Tullahoma, Tenn., assignors to the United States of America as represented by the Secretary of the Air Force
Filed July 26, 1960, Ser. No. 45,505
3 Claims. (Cl. 340—195)

The purpose of this invention is to provide an angle transducer for determining remotely the angular position of any body rotatably mounted on a shaft capable of rotation about the shaft through any angle greater or less than 360°, while at the same time introducing no additional friction to the body's rotation.

Briefly, this is accomplished by two magnetic cores, each having a winding attached with 180° spacing to the shaft and situated inside a cylindrical housing of magnetic material carried by the rotating body and eccentric with respect to the shaft. The air gaps between the cores and the housing therefore vary differentially as the body rotates and consequently a similar variation occurs in the winding reactances. For rotation in a single direction, the angular position of the body may be determined by making a historical record of the output of a Wheatstone bridge having the windings as two of the legs. Since no mechanical or electrical connections to the rotating body are required, the device does not impede its freedom of rotation in any way.

A more detailed description of the invention will be given with reference to the specific embodiment thereof shown in the accompanying drawings in which:

FIGS. 1A and 1B are sectional views of the transducer,

FIG. 2 is a bridge and rectifier circuit for producing an electrical output related to the angular position of the rotating body, FIG. 2A illustrates a suitable rectifier for use in FIG. 2, and FIG. 3 is a calibration curve of the angle transducer.

Referring to FIGS. 1A and 1B, stationary shaft 1 has a housing generally indicated by reference numeral 2 rotatably mounted thereon as by anti-friction bearings 3 and 4. The housing 2 may have any structure attached thereto for rotation about shaft 1 and for which angular positional information is to be transmitted to a remote point. The housing comprises end members 5 and 6 and a body portion 7. The outer surface of body portion 7 is cylindrical and concentric with the bearings 3 and 4. The inner surface is also cylindrical but is eccentric with respect to the bearings and consequently with respect to shaft 1. The housing therefore contains a cylindrical cavity that is eccentric with respect to the shaft. The housing is made of a magnetic material such as steel.

A sleeve 8, pressed onto shaft 1, has magnetic E cores 9 and 10, equipped with coils 11 and 12, attached at diametrically opposite points. The magnetic circuit linking each coil is made up of the E core, the housing 2 and the air gap between the E core and the housing. It will be apparent that, as housing 2 rotates, the air gaps and therefore the coil inductances vary differentially. Considering the angular position of the housing as shown in the drawing to be 0° position, it is seen that in this position the air gaps of the two windings and therefore their inductances are equal. If the housing 2 is rotated clockwise by 90° the winding 12 gap is at a minimum and the winding 11 gap is at a maximum, so that winding 12 has its maximum inductance and winding 11 has its minimum inductance. At a clockwise angle of 180° the gaps and inductances are again equal, and at a clockwise angle of 270° the inductance of winding 11 is at a maximum and that of winding 12 is at a minimum. An additional 90° rotation reestablishes the conditions that existed at 0°.

FIG. 2 illustrates a suitable method of recording the angular position of housing 2 relative to shaft 1. Windings 11 and 12 together with resistors $R_1$ and $R_2$ form a bridge circuit energized with an alternating voltage of constant frequency and amplitude derived from source 13. If $R_1=R_2$ the bridge is balanced when the inductances of windings 11 and 12 are equal, since the windings would then have equal reactances, and no voltage appears at output terminals $a$–$b$. This condition exists in the above described 0° and 180° angular positions of the housing 2. At all other angular positions of the housing an alternating output voltage occurs at terminals $a$–$b$ since the reactances of windings 11 and 12 are different. The magnitude of this voltage is determined by the degree of difference in the winding reactances and its phase is the same as that of power source 13 or opposite to that of the source depending upon which winding has the greater reactance. Consequently, the phase of the output voltage during the 0°–180° rotation of the housing is opposite to the phase of the output voltage during the 180°–360° rotation. In order to determine the phase as well as the magnitude of the output voltage a phase sensitive rectifier 14 is used. The rectifier is supplied with a reference phase from source 13 over conductors 15 and the output of the bridge is applied to the rectifier over conductors 16. The output of the rectifier is a direct voltage proportional in magnitude to the bridge output with the polarity determined by the phase of the bridge output, i.e., which of the windings 11 and 12 has the greater reactance. This voltage may be recorded by a suitable recording voltmeter 17. Phase sensitive rectifiers are well known in the art, a suitable example being shown in FIG. 2A.

FIG. 3 shows a calibration curve for the transducer obtained by plotting the output voltage of rectifier 14 against the angle through which the housing 2 has been turned in one direction, measured from the zero position illustrated in FIG. 1B. By comparing the record of voltmeter 17 with the calibration curve the angular position of the housing 2 at any instant, measured from its zero position, may be determined.

We claim:

1. A transducer for remotely indicating the angular position of a housing rotatably mounted on a fixed shaft, comprising: a cylindrical body made of magnetic material included in said housing, said cylindrical body surrounding said shaft and having an inner cylindrical surface eccentric relative to said shaft and parallel therewith; a pair of E-shaped magnetic cores attached to said shaft at diametrically opposed points, said cores being located within said housing with the open ends of the cores extending equal distances from said shaft toward said inner cylindrical surface, the distance extended being such as to leave an air gap between the cores and said inner surface at all angular positions of said housing; a conductive winding on the central leg of each of said E-shaped cores, the inductive coupling between said windings being substantailly zero, the inductance of each winding varying with changes in the air gap between its respective core and said eccentric inner cylindrical surface; and means remote from said transducer and connected to said windings for indicating the angular position of said housing.

2. The transducer of claim 1, wherein said windings comprise two adjacent legs of a bridge circuit, said means remote from said transducer including two resistors connected to said windings to form the remaining two legs of said bridge circuit, and an alternating current source connected across the input diagonal of said bridge circuit whereby the output voltage of said bridge circuit varies as a function of the angular position of said rotatable housing with respect to said fixed shaft.

3. The transducer of claim 2, wherein said means remote from said transducer further includes phase sensitive means connected to the output diagonal of said bridge circuit and to said alternating current source for producing a direct voltage proportional in magnitude to the output voltage of said bridge and having a polarity determined by the phase of said output voltage relative to the phase of said alternating current source.

References Cited by the Examiner
UNITED STATES PATENTS

| | | | |
|---|---|---|---|
| 1,632,076 | 6/27 | Hubbard | 340—199 |
| 2,053,409 | 9/36 | Urfer | 340—199 |
| 2,494,493 | 1/50 | Schaevitz | 340—199 |
| 2,847,664 | 8/58 | Lewis | 340—271 |

NEIL C. READ, *Primary Examiner.*

E. JAMES SAX, ROBERT H. ROSE, *Examiners.*